United States Patent [19]

Kobayashi et al.

[11] Patent Number: 4,914,428

[45] Date of Patent: Apr. 3, 1990

[54] DIGITAL REMOTE CONTROL TRANSMISSION APPARATUS

[75] Inventors: Hiroshi Kobayashi; Shinji Suda; Katsunobu Hongo; Daisuke Shichinohe; Masako Hiroma, all of Itami, Japan

[73] Assignee: Mitsubishi Denki Kaushiki, Tokyo, Japan

[21] Appl. No.: 55,129

[22] Filed: May 28, 1987

[30] Foreign Application Priority Data

May 30, 1986 [JP] Japan ................................ 61-125997
Jul. 7, 1986 [JP] Japan ................................ 61-159197
Jul. 15, 1986 [JP] Japan ................................ 61-167687

[51] Int. Cl.[4] ................................................ H04Q 9/00

[52] U.S. Cl. ......................... 340/825.620; 340/825.69; 340/825.72; 340/825.2; 341/176

[58] Field of Search ....................... 340/825.07, 825.21, 340/825.52, 825.62–825.64, 825.69, 825.72, 825.2, 825.6; 455/352, 353, 603, 608; 358/194.1; 370/92-94, 8-10; 371/47; 375/23, 108, 112, 113; 341/176

[56] References Cited

U.S. PATENT DOCUMENTS 3,257,651 7/1966 Feisel .
3,631,398 12/1971 Houghton ............................ 455/353
3,767,855 10/1973 Ueno et al. .
3,793,636 2/1974 Clark et al. ..................... 340/825.69
4,099,163 7/1978 Worley et al. ................. 340/825.62
4,143,368 3/1979 Route et al. ......................... 455/603
4,213,119 7/1980 Ward et al. .......................... 455/608
4,242,664 12/1980 Lindstedt et al. .
4,245,347 1/1981 Hutton et al. ........................ 455/352
4,298,978 11/1981 Nakamura ............................. 370/92
4,412,218 10/1983 Niitsu .
4,418,333 11/1983 Schwarzbach et al. ....... 340/825.07
4,482,947 11/1984 Zato et al. ........................... 455/603
4,514,732 4/1985 Hayes, Jr. ........................... 455/603
4,623,887 11/1986 Wels, II .......................... 340/825.69

FOREIGN PATENT DOCUMENTS

85/105037.7 4/1985 European Pat. Off. .
162327 11/1985 European Pat. Off. .
3338046 10/1984 Fed. Rep. of Germany .

OTHER PUBLICATIONS

Edwards, "An Infra Red Remote Control for Consumer Applications", Mar. 1980, Electronic Technology, vol. 14, No. 3, pp. 62–65.
G. Torelli et al, "PCM Remote Control Chips Detect Transmission Errors", Electroinic Engineering, vol. 55, Apr. 1983, No. 676, pp. 41–47.

*Primary Examiner*—Donald J. Yusko
*Assistant Examiner*—Edwin C. Holloway, III
*Attorney, Agent, or Firm*—Birch, Stewart, Kolasch & Birch

[57] ABSTRACT

A digital remote control apparatus for transmitting digital instruction signals to a controllable apparatus includes a transmitter for transmitting a coded digital instruction signal composed of a sequence of synchronization pulses having a predetermined period and data pulses each inserted between successive synchronization pulses at predetermined positions therein dependent upon whether the data pulses represents a "0" bit or a "1" bit. The receiving apparatus distinguishes between "0" and "1" bits by detecting the length of an interval between the leading edge of a synchronization pulse and the leading edge of an adjacent data pulse and determines the existence of noise if more than one data pulse is detected between successive synchronzation pulses. In this way, information decoding is facilitated by enabling the length of each data word to be constant, regardless of the number of ones and zeroes in the word, and also facilitates the detection of communication transmission error by detecting the presence of more than one data pulse between successive synchronization pulses of a constant period as being noise.

2 Claims, 4 Drawing Sheets

(a)
(b)
"0"
"1"
1ms
2ms
3ms
21
22
23
24
25
26
71
1
2
3
4
5
6

DIGITAL REMOTE CONTROL TRANSMISSION APPARATUS

FIELD OF THE INVENTION

The present invention relates to a digital remote control apparatus, and more particularly to an improvement in the transmission format of such an apparatus.

A digital remote control apparatus is used for conducting channel setting, volume adjustment, ON/OFF of a power supply, tape play, tape stop, fast forwarding, rewinding, advanced programming of start/stop time, date, channel, and days of the week for video or audio recording in electronic appliances such as a television, a video tape recorder, and an audio tape recorder. It is also used in the selection of cooling, heating, or dehumidification, the setting of temperature and time, and ON/OFF of the power supply in appliances such as in an air conditioner. In summary, it is used as a remote control apparatus in various electric appliances, automobiles, robots, and electro medical equipment.

BACKGROUND ART

FIGS. 1 and 2 show block constructions of a general digital remote control system. In the Figures the reference numeral 31 designates a transmitting circuit including a key input read circuit 11, a code modulation circuit 12, a timing generator 13, and an oscillator 14. The reference numeral 32 designates a receiving circuit including a preamplifier 18, and a remote control signal demodulation circuit 19. The reference numeral 33 designates a light emitting diode or other light emitting element. The reference numeral 34 designates a photo diode or other light receiving element. The reference numeral 10 designates a key matrix for inputting information to the key input read circuit 11 of the transmitting circuit 31. The reference numeral 15 designates a driver circuit comprising a transistor which receives a coded signal from the code modulation circuit 12 of the transmitting circuit 31 and causes a corresponding current to flow through the light emitting element 33. The reference numeral 16 designates a modulated light information beam transmitted from the light emitting element 33 to the light receiving element 34.

In such a system, the instruction to be transmitted is input to the transmitting circuit 31 by the key matrix 10, encoded by the transmitting circuit 31, modulated and transmitted in a light signal 16 by the light emitting diode 33. The transmitted light signal 16 is received by the photo diode 34, and demodulated by the receiving circuit 32 to decode the instruction.

FIG. 3 shows a transmission format in such a transmission system which has been already developed by the present inventor. The discrimination of one bit information "0" and "1" is conducted by detecting the intervals 41 and 42 between two sequential pulses as shown in FIG. 3. That is, the short time interval 41 from the rising edge of one pulse to the rising edge of the next pulse (in FIG. 3(*a*)) corresponds to a bit "0", and the long time interval 42 of that FIG. 3(*b*) corresponds to a bit "1". Several "0" and "1" bits are combined to constitute a word as shown in FIG. 4, and various instructions are distinguished from each other by decoding the data code of this word. In the example of FIG. 4, one word 5 comprises a six bit construction, and in this figure the data word 5 is "010000". Herein, the code 6 designates the repetition period of the word 5.

In this transmission system, however, the time length of the word depends on the number of "0" or "1" bits in a word, and this results in difficulty in the interpretation of data because of unawareness of the length of a specific word at the receiving side. Furthermore, as shown in FIG. 5, when a noise signal occurs between two pulses which represent the bit "1", this bit "1" is erroneously judged as "00" at the receiving side, leading to a malfunction. This causes a fatal defect in such a remote control system.

In order to avoid interference between remote control systems, systems are distinguished from each other by a custom code for distinguishing the apparatus to be controlled comprising an initial two bits of a transmission data code, while the other subsequent four bits constitute an instruction code for operating the apparatus to be controlled, as in the example of FIG. 4. However, in the remote control field, various remote controls having various bit constructions are adopted, and therefore there is a possibility that interferences may arise which prevent the system from being used when criteria for judging the "0" or "1" bits are similar to each other such that bit numbers of different systems may undesirably coincide with each other.

SUMMARY OF THE INVENTION

It is an object of the present invention to provide an improved digital remote control transmission apparatus having a constant word length and having superiority in anti-noise characteristics, and further which is capable of including a plurality of independent remote control systems.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a digital remote control transmission apparatus for controlling an apparatus by sending a digital signal to the apparatus, which comprises: a transmission code of said digital signal comprising a custom code for distinguishing the apparatus to be controlled, an instruction code for operating said apparatus to be controlled, and a separation code for separating said two codes; the respective bits of said custom code and instruction code being data codes which are represented by the positions of data pulses inserted between synchronization pulses of a predetermined period; and said separation codes being codes which include no data pulses inserted between two synchronization pulses.

BRIEF DESCRIPTION OF THE THE DRAWINGS

DETAILED DESCRIPTION OF THE PREFERRED EMBODIMENTS

Figures 6, 7, 8:
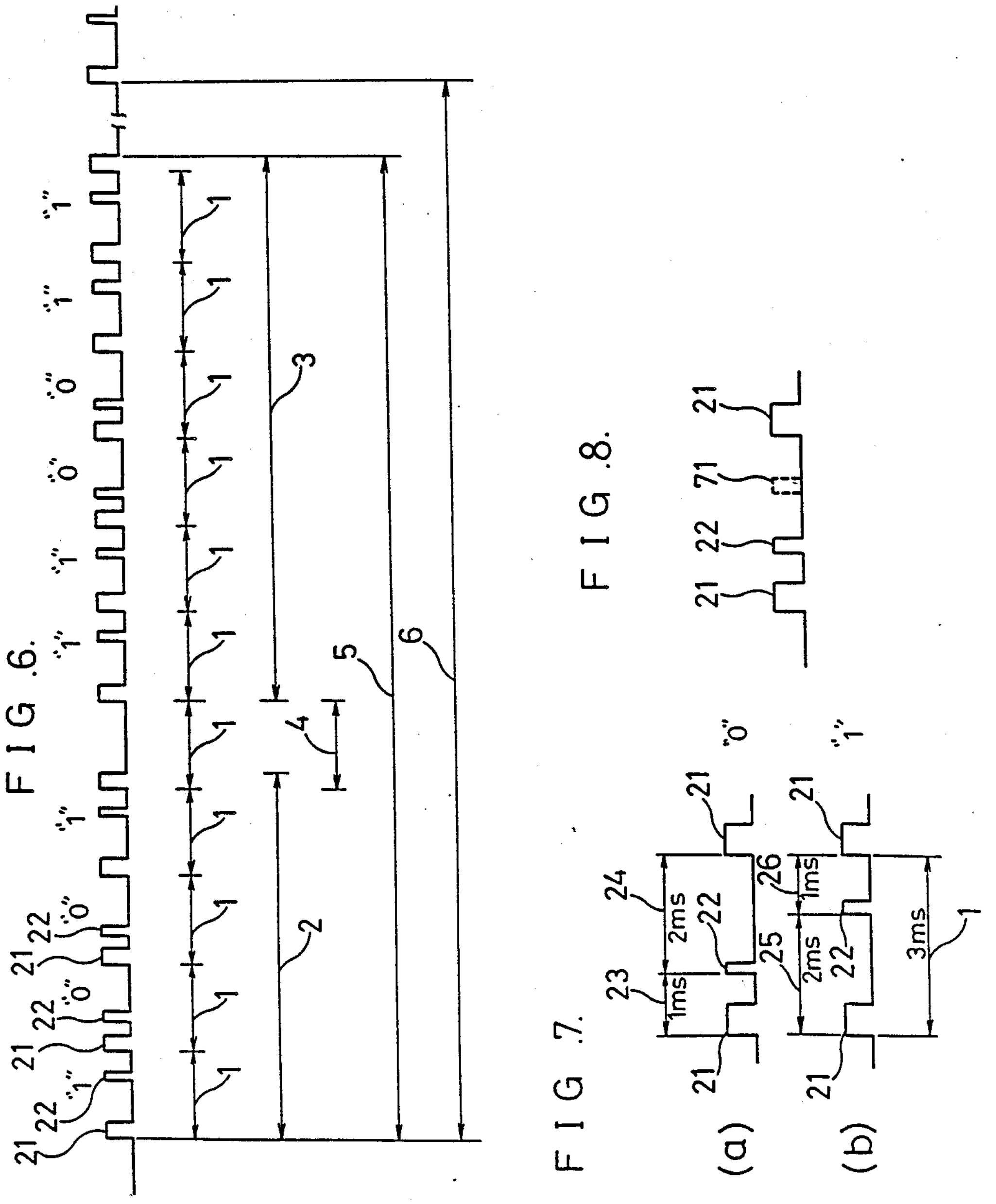
FIG. 6 is a diagram showing the construction of the transmission code of a data signal of the remote control transmission system of a first embodimemt of the present invention.
FIG. 7 is a diagram showing the distinction between bits "0" and "1" in the present invention.
FIG. 8 is a diagram showing the state where noises are injected into the bit information code "0" of the first embodiment.

In order to explain the present invention in detail, reference will be particularly made to FIG. 6.

FIG. 6 shows a construction of the transmission code of a digital remote control transmission apparatus as a first embodiment of the present invention.

Figure 1:
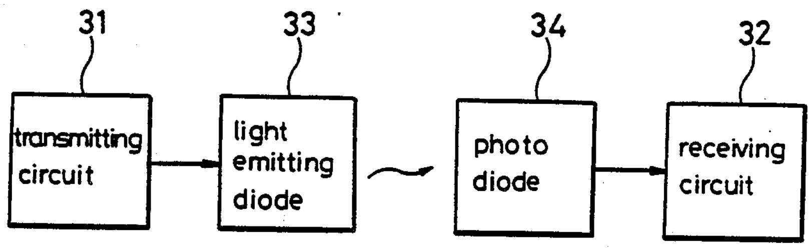
FIG. 1 is a diagram showing a brief block construction of a remote control system of the present invention and the prior art system.
Figure 3:
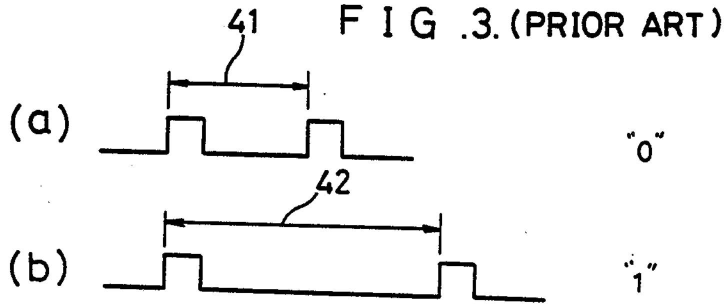
FIG. 3. (PRIOR ART)
FIG. 3 is a diagram explaining the distinction between bits "0" and "1" of the prior art device.
Figure 4:
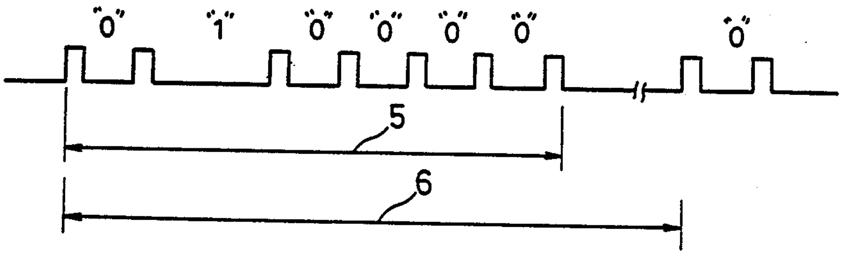
FIG. 4. (PRIOR ART)
FIG. 4 is a diagram showing the construction of the transmission code of a data signal of the prior art remote control transmission apparatus.
Figure 5:
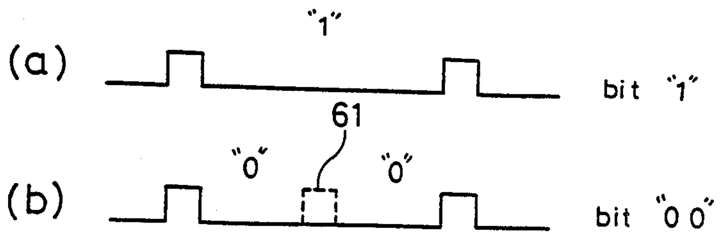
FIG. 5. (PRIOR ART)
FIG. 5 is a diagram showing the state where noises are injected into the bit information code of the prior art device.
Figure 2:
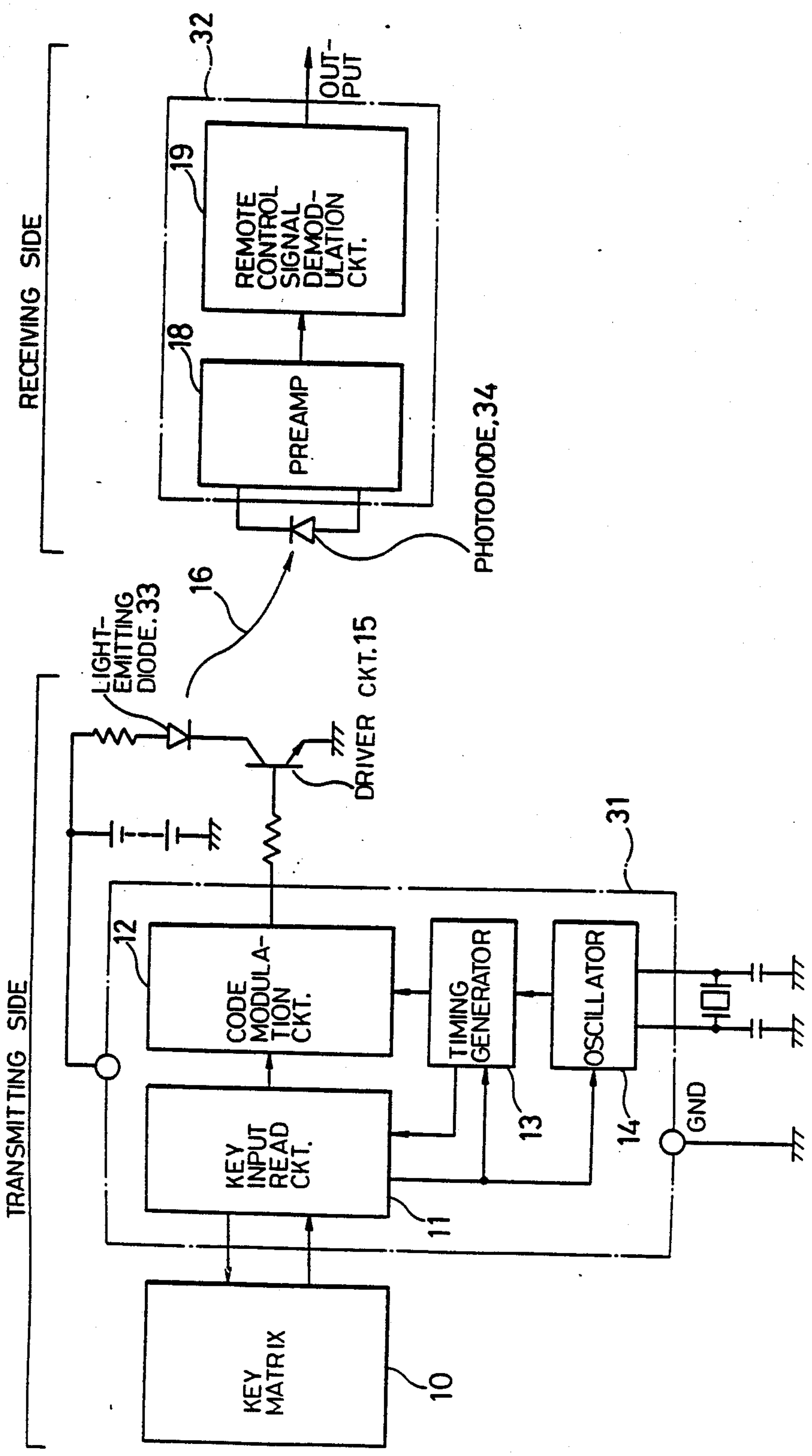
FIG. 2 is a diagram showing a schematic example of the construction of FIG. 1.

In FIG. 6, reference numeral 21 designates a synchronization pulse of a predetermined period, this synchronization pulse being derived from the pulse which is output from the timing generator 13 and applied to the code modulation circuit 12, which generator 13 receives pulses of a predetermined period from the oscillator 14 shown in FIG. 2. The reference numeral 22 designates a data pulse inserted between synchronization pulses 21. For example, this data pulse is produced by a signal from the key matrix 10 read into the key input read circuit 11, and synchronized with the timing of the timing pulses output from the timing generator 13, such that the synchronized data is input to the code modulation circuit 12. The reference numeral 1 designates a one bit period corresponding to the period between the synchronizaton pulses 21. The reference numeral 2 designates a custom code for distinguishing the apparatus to be controlled at the receiving side. In the embodiment this custom code has a four bit construction. The reference numeral 3 designates a data code period for operating the apparatus to be controlled (instruction code). In this embodiment this data code has a six bit construction. The reference numeral 4 designates a separation code period for separating the custom code 2 from the data code 3, which is provided as a characteristic of the present invention. In this embodiment the separation period comprises a code in which data pulses are not inserted between two synchronizaton pulses 21. The reference numeral 5 designates a complete word of the transmission code, and the reference numeral 6 designates a repetition period. The construction of the remote control system of the present embodiment is otherwise the same as that of FIGS. 1 and 2. In this embodiment, the discrimination of the bits "0" and "1" is made as follows. When the period 23 or 25 from the rising edge of the synchronization pulse to the rising edge of the data pulse subsequent to the synchronization pulse (or from the falling edge of the synchronization pulse to the falling edge of the data pulse subsequent thereto) is 1 ms the bit is "0" (FIG. 7(*a*)), and when the former period is 2 ms the bit is "1" (FIG. 7(*b*)). Accordingly, the period 1 of the synchronizaton pulse 21 is 3 ms.

In this embodiment, the four bit custom code 2 (which is "1001" in the example of FIG. 6) is first transmitted, the period including no data pulses (separation code) 4 is transmitted next, and finally the six bit data code 3 (which is "110011" in the example of FIG. 6) is transmitted.

Accordingly, the word length of the transmission code 5 which has ten bits is constant regardless of the number of "0" or "1" in the data. For example, the word length is 33.25 ms (=3 ms×11+0.25 ms) when the pulse width of the synchronizaiton pulse is 0.25 ms. Thus, the data interpretation is facilitated. Furthermore, even if a noise signal 71 as shown in FIG. 8 is inserted into the data of bit information "0", the situation arises that two data pulses are present between synchronization pulses and it is possible to prevent the malfunctioning of the receiving side apparatus because it is easy to judge such an occurrence as noise.

Furthermore, the transmission code 5 is divided into the custom code 2, the data code (instruction code) 3, and the period (separation code) 4 representing the boundary therebetween. Accordingly, even if the number of bits of the whole transmission code is equal to each other in different systems, it is possible to produce code systems which do not interfere with each other by changing the number of bits in the custom code and the data code. That is, it is possible to produce a plurality of independent remote control systems with a transmission code having the same overall number of bits.

Figure 9:
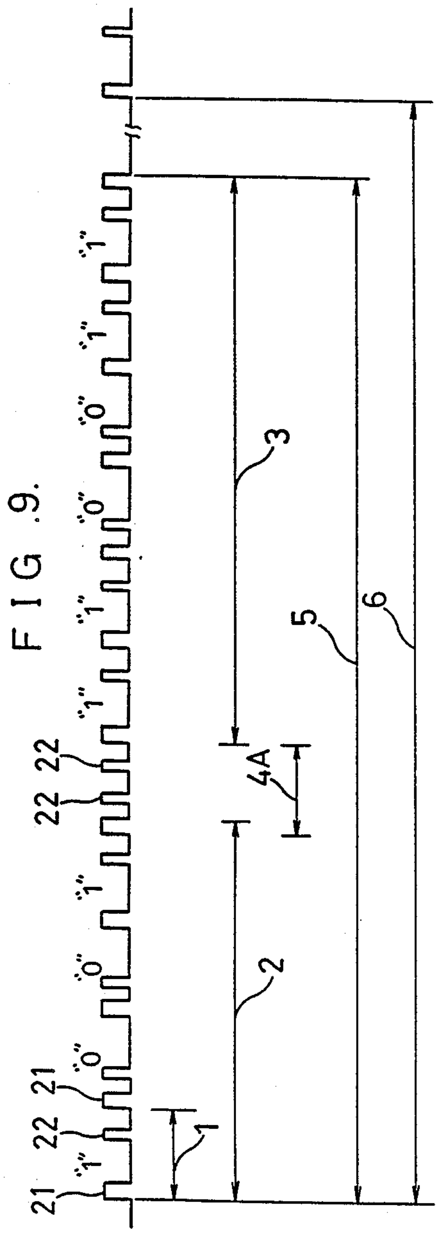
FIG. 9 is a diagram showing the code construction of the remote control transmission system of a second embodiment of the present invention.

FIG. 9 shows a construction of the transmission code of a second embodiment of the present invention. This second embodiment is different from the first embodiment only in the separation code 4A. This separation code 4A is constructed such that two data pulses 22 are inserted between two synchronization pulses 21.

Also in this second embodiment, the four bit custom code 2 (which is "1001" in the example of FIG. 9) is transmitted first similar to the first embodiment, a separation code 4A including two data pulses is transmitted next, and finally the six bit data code 3 (which is "110011" in the example of FIG. 9) is transmitted.

In this case, the word length of the transmission code 5 is constant regardless of the number of "0" or "1" bits. For example, when the pulse width of the synchronization pulses is 0.25 ms, a word length is 33.25 ms (=3 ms×11+0.25 ms).

Figure 10:
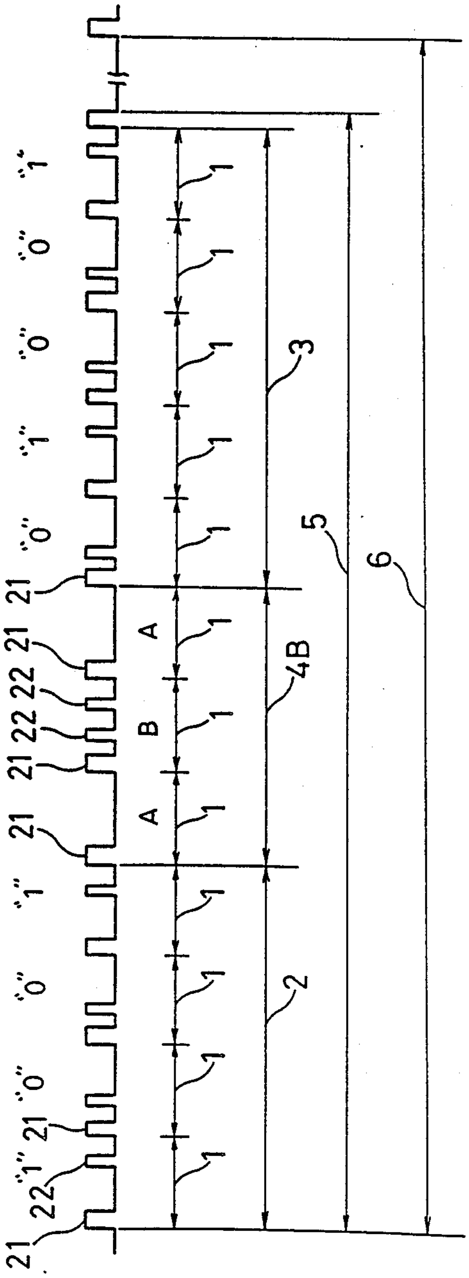
FIG. 10 is a diagram showing the code construction of the remote control transmission system of a third embodiment of the present invention.

Furthermore, as the transmission code 5 is divided into the custom code 2 and the data code 3 by providing the separation code 4A as a boundary, it is possible to produce code systems which do not interfere with each other even if the number of bits of the whole of transmission code is equal to each other by changing the number of bits in the custom code and the data code. That is, it is possible to produce a plurality of code systems with a use of the transmission codes having the same overall number of bits FIG. 10 shows a construction of a transmission code of a third embodiment of the present invention. This third embodiment is different from the first embodiment only in the separation code 4B. This separation code 4B is constituted by two periods A in which no data pulses are inserted between the two synchronization pulses 21 and a period B in which two data pulses 22 are inserted between two synchronization pulse 21, which period B is inserted between the two periods A.

Also in this third embodiment, a four bit custom code 2 (which is "1001" in the example of FIG. 10) is first transmitted similar to the first embodiment, subsequent thereto a separation code 4B for separting the custom code from the instruction code is transmitted, and finally a five bit instruction code 3 (which is "01001" in the example of FIG. 10) is transmitted.

In this case, the word length of transmission code 5 is constant regardless of the number of "0" or "1" bits. For example, the one word length is 36.5 ms (=3 ms×12 +0.5 Lms) when the pulse width of the synchronizaiton pulses is 0.5 ms.

Furthermore, as the transmission code 5 is divided into the custom code 2, the instruction code 3 and a separation code 4B representing the boundary therebetween, even if the the number of bits whole of the transmission code is equal to each other, it is possible to produce code systems which do not interfere with each other by changing the number of bits in the custom code 2 and the instruction code 3. That is, it is possible to produce a plurality of code systems with the use of the transmission code having the smae overall number of bits.

Furthermore, as the separation code 4B representing the boundary between the custom code 2 and the instruction code 3 is constituted by the period A and the period B having two data pulses between the two synchronizaiton pulses, it is possible to produce code systems which, havng different combinations of the periods A and B, do not interfere with each other.

In the example of FIG. 10, the separation code 4B comprises two periods of A and a period of B in sequence of "ABA", but in this third embodiment it is possible to produce 6 kinds of code systems by only using the separation code 4B in a case where the separation code 4B is a 3 bit code comprising two types of periods. It is possible to increase the number of periods constituting the period 4B in order to produce a larger number of code systems which do not interfere with each other.

Furthermore, in the above-illustrated embodiment, the period of the synchronization pulse is 3 ms, the time length between the rising edges of the synchronization pulse and the data pulse which corresponds to the bit "0" is 1 ms, and that which corresponds to the bit "1" is 2 ms, but these time lengths can be set to any values on the condition that the time lengths may be distinguished from each other as those representing the bits "0" and "1", respectively.

Furthermore, the synchronizaton pulse and the data pulse may be frequency modulted by a particular frequency e.g. 38 KHz so as to conduct transmission in a narrow frequency band, whereby the anti-noise characteristics of the transmission system are enhanced.

Furthermore, a leading pulse having a long pulse width may be inserted before the transmission code so that the arrival of the transmission signal may be easily detected at the receiving side.

Furthermore, the pulse widths of the synchronizaton pulse 21 and the data pulse 22 may be differentiated so as to ease the detection of both pulses at the receiving side.

Furthermore, the number of bits of the custom code and the data code may be differentiated so as to ease the detection of both codes at the receiving side.

Furthermore, in the illustrated embodiment the custom code 2 is transmitted before the instruction code 3, but the instruction code 3 can be transmitted before.

Furthermore, in the first and second embodiments described above, the period 4 for separating the custom code 2 and the data code 3 comprises only one period of the synchronization pulse, but this may comprise an arbitrary number of periods.

Furthermore, the separation code 4B for separating the custom code 2 and the instruction code 3 is comprised of only 3 periods of the synchronization pulses, but any number of periods can be used arbitrarily as already described.

In the above-illustrated third embodiment the period B which constitutes the separation code 4B in combination with the period A has two data pulses between the two synchronizaton pulses, but the number of data pulses of the period B can be selected arbitrarily.

Furthermore, also in such a case the combination of these periods A and B is not restricted to "ABA", and it can be changed arbitrarily as described above.

As is evident from the foregoing description, according to the present invention, the transmission code is constituted by a custom code, an instruction code, and a separation code in such a manner that the respective bit information of "0" or "1" of the custom code and the instruction code is represented by the position of the data pulse relative to the two synchronization pulses of a predetermined period, whereby data interpretation is facilitated and anti-noise characteristics are enhanced. Furthermore, the interference between remote control systems is prevented, and it is thus possible to construct a plurality of independent remote control systems which may be operated in the same. This locality is quite convenient in a remote control dominated environment.

What is claimed is:

1. A digital remote control apparatus for transmitting digital instruction signals to a controllable apparatus for controlling the operation thereof, comprising:

transmitting means for transmitting a coded digital instruction signal to said controllable apparatus, including, means for developing a synchronizaton pulse train having a predetermined period, and means for developing data pulses each inserted between successive synchronization pulses of said synchronization pulse train at predetermined positions dependent upon whether said data pulse represents a "0" bit or a "1" bit;

said coded digital instruction signal including a custom code for distinguishing a specific apparatus to be controlled and an instruction code for designating a specific operation to be performed, said custom code and instruction code being separated in said synchronization pulse train by a separation code, wherein said separation code comprises a period between successive synchronization pulses containing at least two data pulses.

2. A digital control apparatus for transmitting digital instruction signals to a controllable apparatus for controlling the operation thereof, comprising:

transmitting means for transmitting a coded digital instruction signal to said controllable apparatus, including, means for developing a synchronization pulse train having a predetermined period, and means for developing data pulses each inserted between successive synchronization pulses of said synchronization pulse train at predetermined positions dependent upon whether said data pulse represents a "0" bit or a "1" bit;

said coded digital instruction signal including a custom code for distinguishing a specific apparatus to be controlled and an instruction code for designating a specific operation to be performed, said custom code and instruction code being separated in said synchronization pulse train by a separation code, wherein said separation code comprises at least one period between successive synchronization pulses containing no data pulse and at least one period between successive synchronizaton pulses containing at least two data pulses.

* * * * *